United States Patent
Makinson et al.

(10) Patent No.: US 11,056,708 B2
(45) Date of Patent: Jul. 6, 2021

(54) GENERATOR UNIT HAVING A FUEL CELL DEVICE; VEHICLE HAVING A GENERATOR UNIT OF THIS TYPE AND TAIL PIPE DEVICE FOR A GENERATOR UNIT

(71) Applicants: AVL List GmbH, Graz (AT); Nissan Motor Co., Ltd., Yokohama (JP)

(72) Inventors: Julian Makinson, Graz (AT); Siegfried Hartwig, Graz (AT); Daiki Tanaka, Kawasaki (JP)

(73) Assignees: AVL List GmbH, Graz (AT); Nissan Motor Co., Ltd., Yokohama (JP)

( * ) Notice: Subject to any disclaimer, the term of this patent is extended or adjusted under 35 U.S.C. 154(b) by 299 days.

(21) Appl. No.: 16/322,969

(22) PCT Filed: Aug. 2, 2017

(86) PCT No.: PCT/EP2017/069540
§ 371 (c)(1),
(2) Date: Feb. 4, 2019

(87) PCT Pub. No.: WO2018/024775
PCT Pub. Date: Feb. 8, 2018

(65) Prior Publication Data
US 2019/0181487 A1  Jun. 13, 2019

(30) Foreign Application Priority Data
Aug. 2, 2016 (AT) .............. A 50703/2016

(51) Int. Cl.
*H01M 8/2475* (2016.01)
*H01M 8/2485* (2016.01)

(52) U.S. Cl.
CPC ....... *H01M 8/2475* (2013.01); *H01M 8/2485* (2013.01); *H01M 2250/20* (2013.01)

(58) Field of Classification Search
CPC ............. H01M 8/2475; H01M 8/2485; H01M 2250/20; Y02E 60/50; Y02T 90/40
See application file for complete search history.

(56) References Cited

U.S. PATENT DOCUMENTS

| | | | | |
|---|---|---|---|---|
| 2007/0295734 A1* | 12/2007 | Nakajima | ......... | H01M 8/04067 220/592.22 |
| 2011/0273131 A1* | 11/2011 | Yoon | ..................... | H01M 10/46 320/101 |
| 2014/0069715 A1* | 3/2014 | Schuhmacher | ........ | H02G 5/068 174/70 R |
| 2017/0175476 A1* | 6/2017 | Painter | ................ | E21B 33/0385 |

FOREIGN PATENT DOCUMENTS

| | | |
|---|---|---|
| CN | 103895851 | 7/2014 |
| CN | 104728528 | 6/2015 |
| DE | 102013105029 | 12/2013 |
| JP | 04-017270 | 1/1992 |

OTHER PUBLICATIONS

International Search Report and the Written Opinion dated Oct. 4, 2017 From the International Searching Authority Re. Application No. PCT/EP2017/069540. (10 Pages).

* cited by examiner

*Primary Examiner* — Muhammad S Siddiquee

(57) ABSTRACT

The present invention relates to a generator unit (1) comprising a housing (100) having at least one opening (112), a fuel cell device, which is arranged in the housing (100), a tail pipe device (200) having at least one exhaust pipe (210), which is connected to the fuel cell device in a gas-carrying manner and extends through the opening (112) of the housing (100), and an insulator (220), which extends at least in an area between an outer wall of the exhaust pipe (210) and an edge of the opening (112) and, in particular, reduces, in particular, at least for the most part, prevents, heat transfer from the exhaust pipe (210) to the housing (100). Furthermore, the present invention relates to a tail pipe device (200) for use in a generator unit (1) of the type described here.

18 Claims, 7 Drawing Sheets

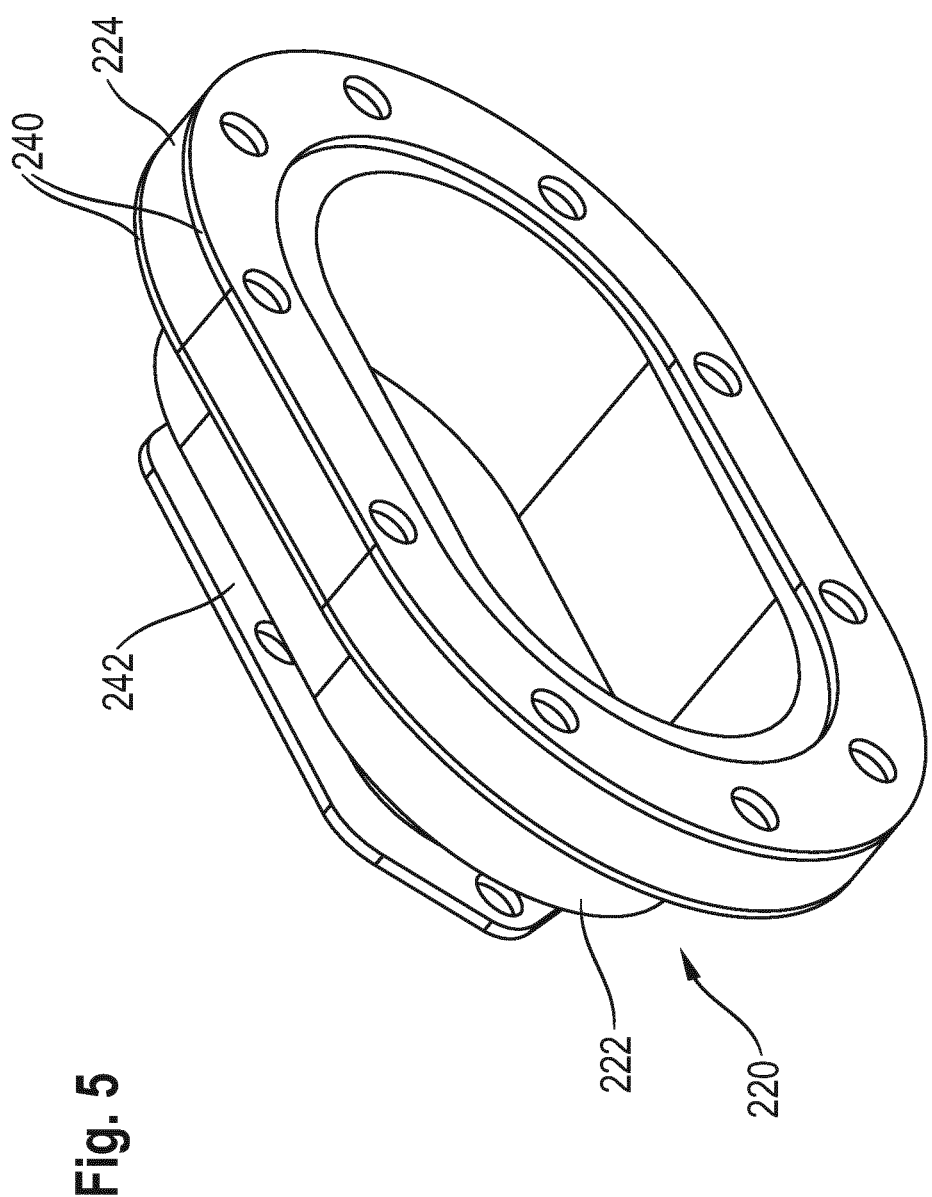

GENERATOR UNIT HAVING A FUEL CELL DEVICE; VEHICLE HAVING A GENERATOR UNIT OF THIS TYPE AND TAIL PIPE DEVICE FOR A GENERATOR UNIT

RELATED APPLICATIONS

This application is a National Phase of PCT Patent Application No. PCT/EP2017/069540 having International filing date of Aug. 2, 2017, which claims the benefit of priority of Austrian Patent Application No. A 50703/2016 filed on Aug. 2, 2016. The contents of the above applications are all incorporated by reference as if fully set forth herein in their entirety.

FIELD AND BACKGROUND OF THE INVENTION

The present invention relates to a generator unit having a fuel cell device, a vehicle having a generator unit of this type and a tail pipe device for a generator, in particular of this type.

Fuel cells have been known in theory since the middle of the 19th century. A "fuel cell device" within the meaning of the present invention is a galvanic cell that converts the chemical reaction energy of a continually supplied fuel and an oxidant into electrical energy. This may also be referred to as so-called "cold combustion."

The operation of the fuel cell device is based on the redox reaction, in which the reduction and oxidation take place in physical separation, specifically at a boundary between anode and electrolyte or between electrolyte and cathode. This redox reaction is preferably a reaction of oxygen with the fuel, in particular hydrogen or carbon monoxide. On the cathode side, there is preferably an excess of oxygen, while on the anode side there is a shortage of oxygen, because the oxygen that is present immediately reacts with the fuel, for example, with the hydrogen. Because of this concentration gradient, the oxygen diffuses from the cathode to the anode. However, because the electrolyte in between is permeable only for oxygen ions and not for oxygen molecules, the oxygen molecule picks up two electrons at the boundary between cathode and electrolyte, whereby it becomes an ion and can penetrate the barrier. Once it has arrived at the boundary with the anode, it reacts catalytically with the fuel gas, giving off heat and corresponding combustion products and surrendering two additional electrodes [sic] to the anode. A requirement for this is an electrically conductive connection between anode and cathode in which a current flow is created that can be used for operating different conductively connected systems.

The use of this technology in automobiles has been the subject of research by a plurality of automotive companies for more than 20 years. Conventional fuel cells generally use gaseous hydrogen as fuel for the fuel cell.

In particular for application as an APU, a solid oxygen fuel cell (SOFC) is preferably used, which is, in particular, a high-temperature fuel cell having an operating temperature of 650° C. to 1,000° C. According to one embodiment, the electrolyte in this type of cell comprises a solid ceramic material that can conduct oxygen ions and simultaneously has an insulating effect for electrons. The oxygen-ion-conduction electrolyte is preferably provided as a thin membrane to be able to transport the oxygen ions using minimal energy. This works especially well at high temperatures. The outer side of the cathode facing away from the electrolyte is surrounded by air; the outer side of the anode by fuel gas. Unused air and unused fuel gas, as well as combustion products, are preferably suctioned off.

Due to the high operating temperatures and the correspondingly high exhaust temperatures, an exhaust pipe, through which the exhaust gas that has arisen is discharged from the fuel cell device, heats up. Due to the good heat conducting properties of metal, in particular steel or aluminum, components that come into contact with this exhaust pipe also heat up. To reduce heat transfer between the exhaust pipe and a housing surrounding the fuel cell device, it is a common measure to make the opening of a passage for the exhaust pipe larger in terms of its diameter than the diameter of the exhaust pipe. As a result of this, a gap forms between the housing wall and the exhaust pipe, through which a heat transfer is at least partially reduced.

A housing for a fuel cell stack, comprising two end plates, two side walls located opposite one another, a lateral connecting wall and at least one media exchange element is known from WO 2016/030211 A1. The two end plates are arranged on both ends of the fuel cell stack. The two side walls located opposite one another connect the end plates to one another. The lateral connecting wall connects the side walls located opposite one another to one another. The at least one media exchange element comprises media connections. The two end plates are each designed as a thermally insulating support structure.

SUMMARY OF THE INVENTION

It is an object of the present invention to provide an improved generator unit having a fuel cell device. In particular, it is to have good thermal insulation properties and preferably reduce, in particular preferably even prevent, heating of a housing of the generator unit on its own.

This object is achieved by a generator unit according to claim 1, a vehicle according to claim 13 and by a tail pipe device according to claim 15. The features of the advantageous embodiments described in the following can be combined with one another as desired, unless this is explicitly excluded. In particular, the features and advantages described with respect to a first aspect of the invention also apply to other aspects of the invention and its advantageous embodiments and vice versa.

A first aspect of the present invention relates to a generator unit comprising a housing having at least one opening, a fuel cell device, which is arranged in the housing, a tail pipe device having at least one exhaust pipe, which is connected to the fuel cell device in a gas-carrying manner and extends through the opening of the housing, and an insulator, which extends at least in an area between an outer wall of the exhaust pipe and an edge of the opening and, in particular, reduces, in particular, at least for the most part, prevents, heat transfer from the exhaust pipe to the housing.

A preferred use of the generator unit according to the invention is in a land-bound vehicle, such as a personal motor vehicle and/or truck, as an auxiliary power unit (APU), in particular to provide electrical power for on-board systems when the drive system, for example an internal combustion engine with a connected alternator, is switched off.

Another preferred use of the generator unit according to the invention is in a land-bound vehicle, such as a personal motor vehicle and/or truck, as a component of the primary drive. The electrical energy produced is used at least in part for driving the vehicle.

A "generator unit" within the meaning of the present invention refers, in particular, to a device that provides electrical energy. A generator unit in the sense of the present invention is in particular an APU, which provides electrical energy in a vehicle if the primary drive is switched off.

Within the meaning of the present invention, a "housing" refers in particular to a device that has a cavity in which additional components can be arranged that the device combines to form a structural unit and/or shields against external, in particular gaseous and/or liquid and/or solid environmental influences. The housing of the present invention is particularly preferably formed of a metal material, in particular a sheet-like metal material, in particular a steel or aluminum alloy, and is manufactured in a primary-forming and/or re-forming and/or machining manner.

A "fuel cell device" within the meaning of the present invention is in particular a device that by means of a chemical reaction converts a continuously supplied fuel into electrical energy as a result of a cold combustion. Included in this definition in particular are alkaline fuel cells (AFC), polymer electrolyte fuel cells (PEMFC), direct methanol fuel cells (DMFC), formic acid fuel cells, in particular— depending on the embodiment—having platinum and/or palladium, and/or ruthenium catalysts, phosphoric acid fuel cells (PAFC), molten carbonate fuel cells (MCFC), solid oxide fuel cells (SOFC), direct carbon fuel cells (SOFC, MCFC) and magnesium-air fuel cells (MAFC).

According to a preferred embodiment, the anode is supplied with fuel, in particular bio-ethanol and/or water mixed with ethanol.

The fuel cell device is thus a single fuel cell or a composite of a plurality of fuel cells, in particular in the form of a fuel cell stack.

An "exhaust pipe" within the meaning of the present invention refers in particular to an, at least for the most part, elongated hollow body, the length of which is usually, at least for the most part, greater than a diameter of a cross-section. The exhaust pipe is, in particular, at least for the most part, manufactured from a rigid material, such as metal, in particular steel, aluminum or the like. In contrast to general language use, an exhaust pipe within the meaning of the present invention also refers a hose-like body that is formed from an, at least for the most part, flexible material, such as rubber or metal fabric or the like. Combinations of rigid and flexible pipe or hose sections are also included in the definition of the exhaust pipe.

Within the meaning of the present invention, an "insulator" refers, in particular, to a body made of a material that has a very low electrical and/or thermal conductivity, in particular having a specific resistance of $\geq 10^6$ ohmmeters ($\Omega \cdot m$). According to one embodiment, the insulator is, within the meaning of the present invention, a body having high mechanical resistance. According to one embodiment, an insulator has a material from the group comprising: aluminum oxide, ceramics, steatite, porcelain, glass, glass fiber-reinforced plastics and epoxy resins. Examples for thermal insulators include a vacuum insulating board, an aerogel, a foamed glass, a granular glass foam, mineral wool, polyurethane, expanded polystyrene with graphite, extruded polystyrene, expanded polystyrene, polyethylene foams, wool, cork, a reed panel, cellulose, hemp insulating mats, wood fiber insulation panels, straw bales, perlite or wood wool light construction panels.

In particular, the present invention is based on the approach of thermally decoupling the exhaust pipe of the generator unit from its housing. Thanks to the insulation according to the invention of the exhaust pipe with respect to the housing by the insulator, heat transfer from the exhaust pipe to the housing is, at least for the most part, reduced, in particular prevented, which results in the temperature of the housing being increased only slightly relative to its surroundings, in particular, at least for the most part, not increased. This is advantageous because it is possible to dispense with additional insulation of the housing. In this manner, a mechanic can, for example, work on or in the vicinity of the generator unit in the course of a repair or inspection without running the risk of suffering from health hazards, in particular from burns or the like.

According to an advantageous embodiment, the fuel cell device is closed off by the housing, at least for the most part, in an airtight manner. This is particularly advantageous because a robustness against gaseous and/or liquid and/or solid environmental influences is thus increased. This is also advantageous because in this manner a possible gas leak from the fuel cell device, for example of hydrogen, cannot escape in an uncontrolled manner, but, if applicable, can be detected via corresponding means to initiate appropriate countermeasures and/or protective measures if necessary.

According to another advantageous embodiment, a first section of the insulator has an, at least for the most part, cylindrical, in particular hollow-cylindrical, basic shape. According to a preferred embodiment, the first section of the insulator surrounds the exhaust pipe, at least for the most part, completely, in particular completely, in relation to at least one cross-section of the exhaust pipe.

According to another advantageous embodiment, the first section of the insulator is arranged between the edge of the opening and the exhaust section. This is particularly advantageous because in this way a complete encasement of the exhaust pipe is preferably provided by the insulator in the area of the passage through the opening of the housing.

According to another advantageous embodiment, the first section of the insulator forms a connection between the housing and the exhaust pipe that is, at least for the most part, impermeable to air, liquids and/or solids. This is particularly advantageous for protecting the fuel cell device, at least for the most part, against gaseous and/or liquid and/or solid environmental influences and/or providing an additional support for the exhaust pipe such that the latter does not need to be held in a freely supporting manner extending outward from the inside of the housing.

According to another advantageous embodiment, a second section of the insulator has an, at least for the most part, disk-shaped basic shape, having an in particular circular recess, through which the exhaust pipe passes. This is particularly advantageous for embodiments in which the exhaust pipe is held on the housing by means of a flange in order to also provide a desired insulating effect between the flange and the housing wall.

A "flange" within the meaning of the present invention is a connection element, in particular a non-destructively detachable connection element, for connecting and closing pipes, machine parts or housings, in particular using bolts and nuts.

According to another advantageous embodiment of the present invention, the exhaust pipe has a first flange, which is provided, in particular set up, to secure the exhaust pipe to the housing, in particular to a wall, in particular to an outer wall of the housing.

According to another advantageous embodiment, the second section of the insulator is arranged in an area between the housing wall and a side of the flange facing the housing wall. This is particularly advantageous because in this manner a heat transfer from the exhaust pipe is reduced, in particular, at least for the most part, prevented.

According to another advantageous embodiment, the insulator has at least one first section having an, at least for the most part, cylindrical, in particular hollow-cylindrical, basic shape as well as a second section having at least one for the most part disk-shaped basic shape, in particular having an in particular circular recess, through which the exhaust pipe passes. According to a preferred embodiment, the insulator thus has an, in particular for the most part, rotationally symmetrical, L-shaped cross-section. This is particularly advantageous because in this manner thermal radiation of the exhaust pipe, in particular of the section of the exhaust pipe that extends through the opening of the housing, is radiated onto at least one housing wall. This thermal radiation is at least partially, in particular, at least for the most part, completely, in particular completely, absorbed or reflected by the insulator, such that an area of the housing wall that is covered by the insulator, at least for the most part, does not heat up beyond a specified limit temperature, in particular 50° C.

According to another advantageous embodiment, the opening of the housing is larger than the, in particular widest, cross-section of the parts of the tail pipe device arranged in the installation position inside of the housing, in particular to make it possible to insert these parts of the tail pipe device through the opening from the outside during installation. This is particularly advantageous because in this manner easy installation of the tail pipe device on the fuel cell device and/or the housing is made possible, in particular by inserting it through the opening in one piece from the outside.

According to another advantageous embodiment, the at least one exhaust pipe has a first flange, in particular on the outside of the housing, the insulator, in particular the second section of the insulator, being arranged partially, in particular, at least for the most part, completely, in particular completely, between the first flange and a housing wall. This is particularly advantageous for combining the aforementioned advantages of the two sections in a single design to reduce both of the heat transfer paths shown, in particular to, at least for the most part, prevent them.

According to another advantageous embodiment, an, at least for the most part, water-tight and/or gas-tight sealing element is arranged between the insulator and the first flange and/or between the housing and the insulator. This is particularly advantageous because in this manner a seal of the interior space of the housing against environmental influences, such as splashing water, is provided, in particular increased. In this manner, the specifications of the generator unit can be changed such that additional application or installation sites and/or extended restrictions with respect to the environmental conditions at the installation site can be permitted. In addition, the robustness of the generator unit, in particular against liquid environmental influences, is increased.

According to another advantageous embodiment, the first flange is held on the housing with at least one holding means, in particular a bolt. This is particularly advantageous because in this manner a reinforced mechanical connection between the exhaust pipe and housing can be provided. In particular, the attachment allows additional degrees of freedom of the exhaust pipe relative to the housing to be limited, in particular taken away. According to an advantageous embodiment, the exhaust pipe is held, in particular fixed, on the housing via the first flange, in particular in a detachable manner.

According to another advantageous embodiment, the at least one holding means reaches through the first flange and a housing wall, and in particular the insulator and/or the at least one sealing element. This is particularly advantageous for providing a connection between the flange and housing wall in this manner using a joint holding means, the components, insulator and sealing element located in between also being fixed. This is particularly advantageous with regard to a simplification of the installation. In this manner, according to a preferred embodiment, the recesses in the insulator and of the at least one sealing element, which limit weak points with respect to their intended task of thermal or fluidic insulation, are advantageously kept small.

According to another advantageous embodiment, the at least one holding element is, at least for the most part, thermally decoupled from the first flange and/or the housing, in particular by a detachable insulation covering or an insulating, non-destructive removable coating. This is particularly advantageous because in this manner a possible heat transfer path from the exhaust pipe to the housing via the holding means can be reduced, in particular prevented.

According to another advantageous embodiment, the at least one holding means has at least one insulating washer.

According to another advantageous embodiment, the generator unit has a second flange, which is provided, in particular set up, to connect the tail pipe device to an exhaust outlet of the fuel cell device that terminates in the housing. The provision of the second flange makes it possible to remove the exhaust pipe or the fuel cell device from the generator unit independently of one another, which facilitates any repair work, in particular on the wear-resistant exhaust pipe.

According to another advantageous embodiment of the generator unit, the second flange is shaped in such a way that it can be guided through the housing opening, in particular such that it has a smaller diameter than the housing opening. This makes repair work particularly easy.

According to another advantageous embodiment, the fuel cell device has a reformer that is, in particular, provided, in particular set up, to provide the fuel cell device with a fuel adapted to its composition.

A "reformer" within the meaning of the present invention is in particular a device into which a fuel starting material, in particular natural gas and/or ethanol, in particular bio-ethanol and/or water mixed with ethanol, specifically bio-ethanol, is supplied and there converted into a fuel, in particular with the addition of heat, in particular a gas mixture comprising hydrogen, carbon dioxide and carbon monoxide. This is particularly advantageous because in this manner the fuel required to operate the fuel cell, in particular the gas mixture, does not have to be stored in this form from the outset, but can be stored in a more stable form and/or a form having a higher energy density, and a conversion into the fuel is only created shortly—in particular, at least for the most part, immediately—before the reaction in the fuel cell.

An additional aspect of the present invention relates to a vehicle, in particular a land-bound vehicle, having a generator unit of the type described here. This is particularly advantageous because in this manner the advantages of the generator unit according to the invention, in particular the high energy efficiency, can be provided for, in particular, daily usage, such as for road transport, which can contribute to the reduction of pollutant emissions.

According to another advantageous embodiment, the vehicle also has a fuel reserve for the provision of fuel, in particular ethanol, in particular bio-ethanol, and/or water mixed with ethanol, in particular bio-ethanol, the fuel being supplied at least partially, in particular, at least for the most part, in particular completely, as a reserve for the operation of the fuel cell device.

"Bio-ethanol" within the meaning the present invention refers to ethanol that, at least for the most part, is produced from biomass or the biodegradable portions of waste. "Agricultural ethanol" is a term used synonymously with this.

Another aspect of the present invention relates to a tail pipe device, in particular for a generator unit of the type described here, comprising at least one exhaust pipe having an upstream end and a downstream end, a first flange, which is provided, in particular set up, to connect the tail pipe device to a housing, in particular a housing of the generator unit, a second flange, which is provided, in particular set up, to connect the tail pipe device to an exhaust outlet, which, in particular, terminates in the housing, in particular to a fuel cell device of the generator unit, and an insulator, which extends at least in an area between an outer wall of the exhaust pipe and an edge of a housing opening and in particular reduces, in particular, at least for the most part, prevents, heat transfer from the exhaust pipe to the housing. This is particularly advantageous because in this manner the tail pipe device is secured both to the exhaust outlet of the fuel cell device and to the housing of the fuel cell device due to the two-stage structure with the first flange and the second flange, which results in a mechanical load relief of the connection via the first flange. This allows the second flange to be designed less mechanically stable, in particular smaller and/or thinner, which can result in weight and cost savings and, according to one embodiment, additionally or alternatively achieving the required installation space for connecting the tail pipe device to the exhaust outlet within the limited installation space inside of the housing.

According to an advantageous embodiment of the tail pipe device, the second flange is arranged closer to the upstream end of the exhaust pipe than the first flange.

According to another advantageous embodiment of the tail pipe device, the insulator extends all the way around an outer wall of the exhaust pipe in at least one section and/or along the side of the first flange in at least one area. For the corresponding advantages and embodiments that build upon this, reference is made to the above embodiments in order to avoid repetitions.

BRIEF DESCRIPTION OF THE SEVERAL VIEWS OF THE DRAWINGS

Further features, advantages and applications of the present invention arise from the following description of various exemplary embodiments with reference to the drawings. Shown are:

FIG. 5 an at least partially schematic representation of an insulator and a plurality of sealing elements according to an embodiment of the present invention;

DESCRIPTION OF SPECIFIC EMBODIMENTS OF THE INVENTION

Figure 1:
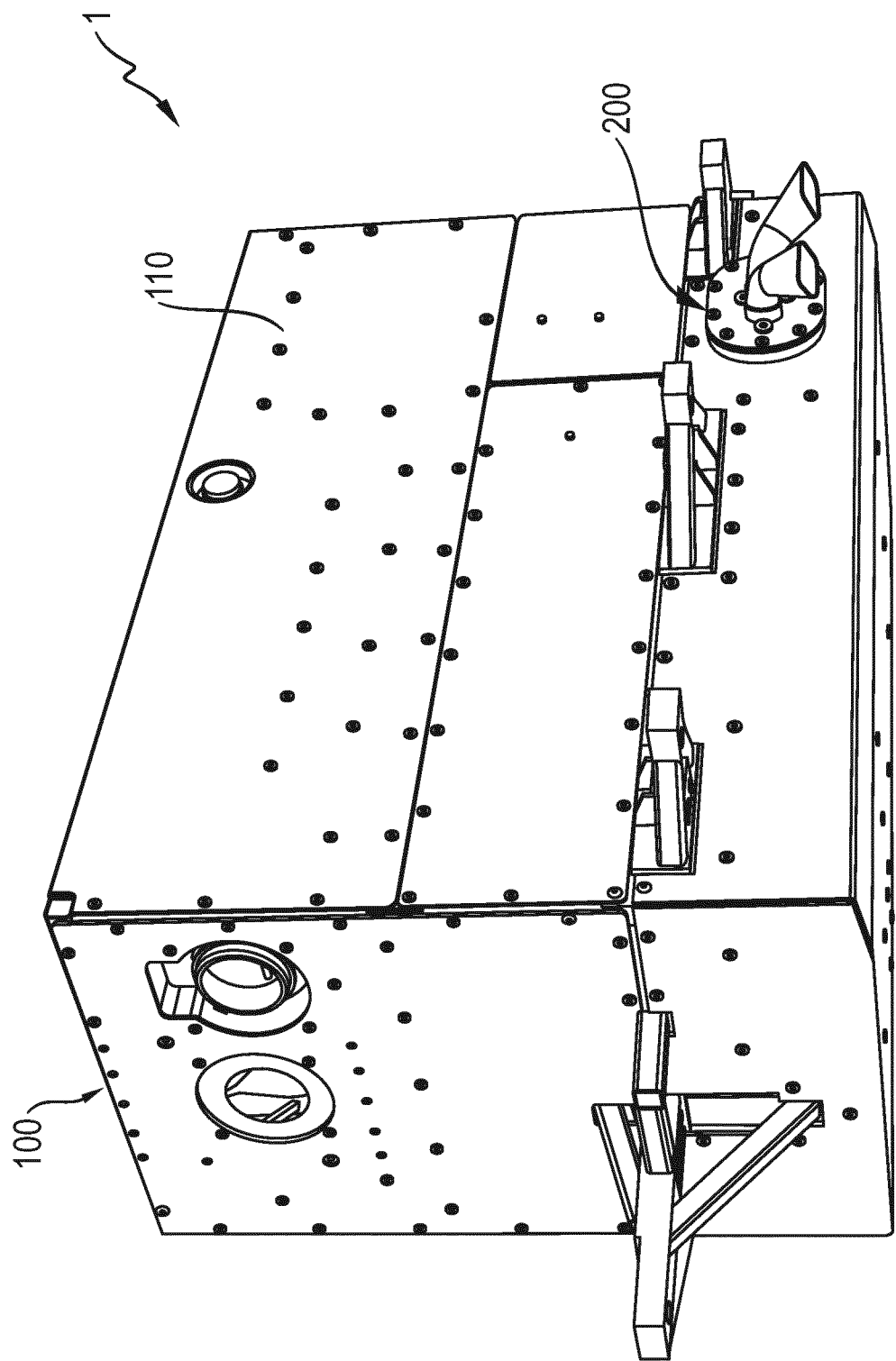
FIG. 1 an at least partially schematic view of a generator unit having a tail pipe device according to an embodiment of the present invention.

FIG. 1 shows an at least partially schematic view of a generator unit 1 having a tail pipe device 200 according to an embodiment of the present invention. A fuel cell device (not shown) is arranged in a housing 100. The latter is connected to tail pipe device 200 in a gas-carrying manner, the tail pipe device having at least one exhaust pipe 210, in the illustration of FIG. 1 two exhaust pipes 210, that extend through an opening 112 of housing 100, in particular a housing wall 110.

Figure 1A:
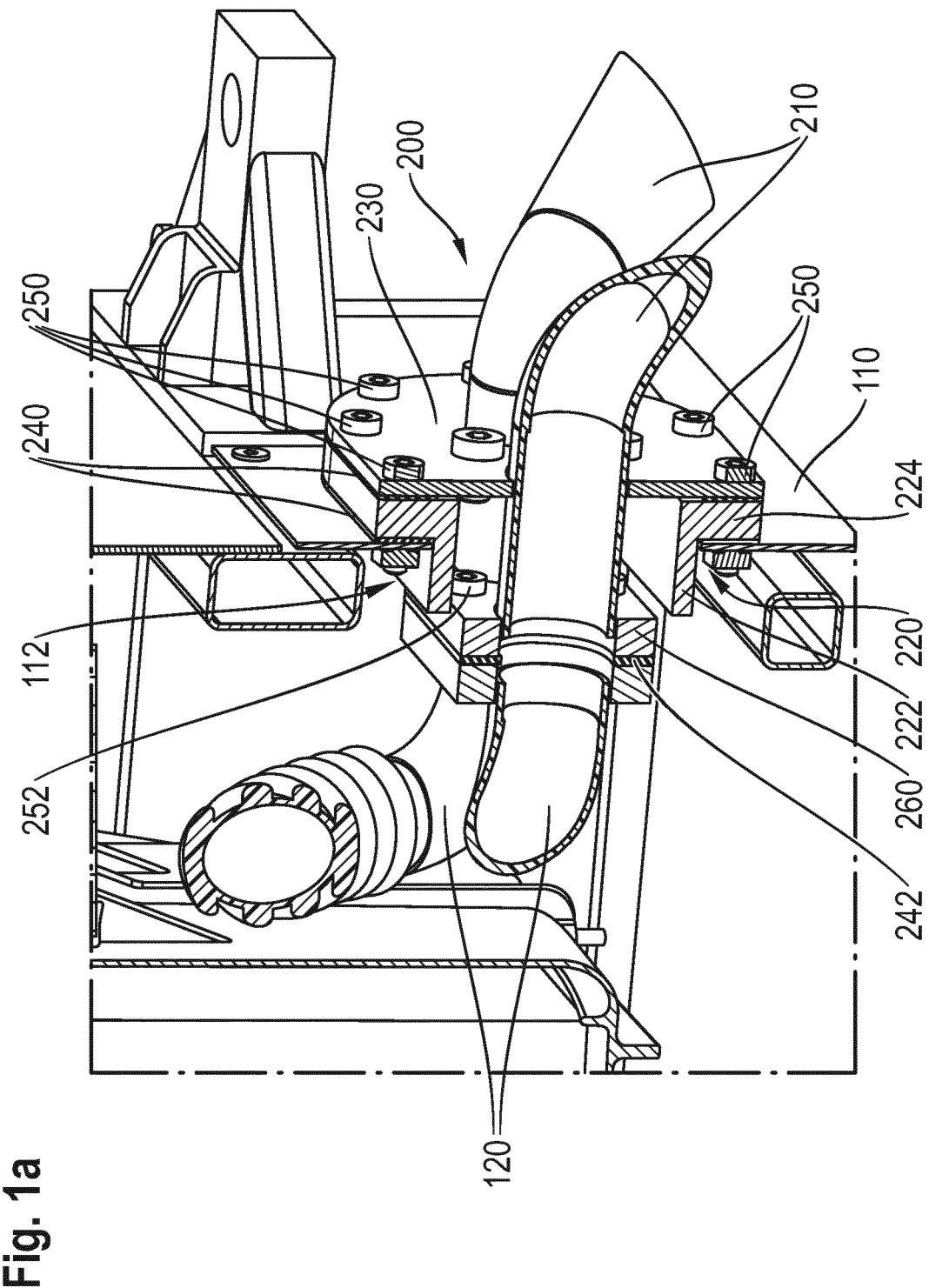
FIG. 1a an at least partially schematic 3D partial sectional view of a tail pipe device according to an embodiment of the present invention in the installed state.

FIG. 1a shows an enlarged partial 3D sectional view of tail pipe device 200 as installed in housing 100. According to the embodiment of FIG. 1a, exhaust outlets 120 of the fuel cell device terminate inside of housing 100 in the area of housing wall 110, in particular in alignment with opening 112 in housing wall 110. According to the embodiment of FIG. 1a, exhaust outlets 120 terminate in an exhaust outlet flange, in particular a joint exhaust outlet flange. Tail pipe device 200 is installed on this exhaust outlet flange by means of additional holding means 252. According to a preferred embodiment, another sealing element 242 is arranged between the exhaust outlet flange and second flange 260, the sealing element, at least for the most part, being water- and/or gas-tight.

Opening 112 is larger in dimension than the exhaust pipes 210 passing through. In this manner, it is possible to insert the tail pipe device with second flange 260 through opening 112 into housing 100 of generator unit 1 from the outside and install it. Tail pipe device 200 is connected, in particular in a detachable manner, to housing 100, in particular housing wall 110, via a first flange 230. According to the embodiment of FIG. 1a, the connection is made by means of a plurality of bolt-like holding means 250, which reach through first flange 230 and engage into housing wall 110 or reach through first flange 230 and housing wall 110 and are secured on the inside of the housing, in particular with nuts.

An insulator 220 and two sealing elements 240 are also provided between first flange 230 and housing wall 110. Sealing elements 240 are, on the one hand, arranged between housing wall 110 and insulator 220 as well as between insulator 220 and first flange 230. Insulator 220 has a first section 222, which has an, at least for the most part, cylindrical shape, in particular a hollow-cylindrical basic shape, and a second section 224, which has an, at least for the most part, disk-shaped basic shape, in particular having an in particular circular recess, through which exhaust pipe 210 passes. Together, both sections 222, 224 of insulator 220 form an, at least for the most part, L-shaped cross-section.

Figure 2:
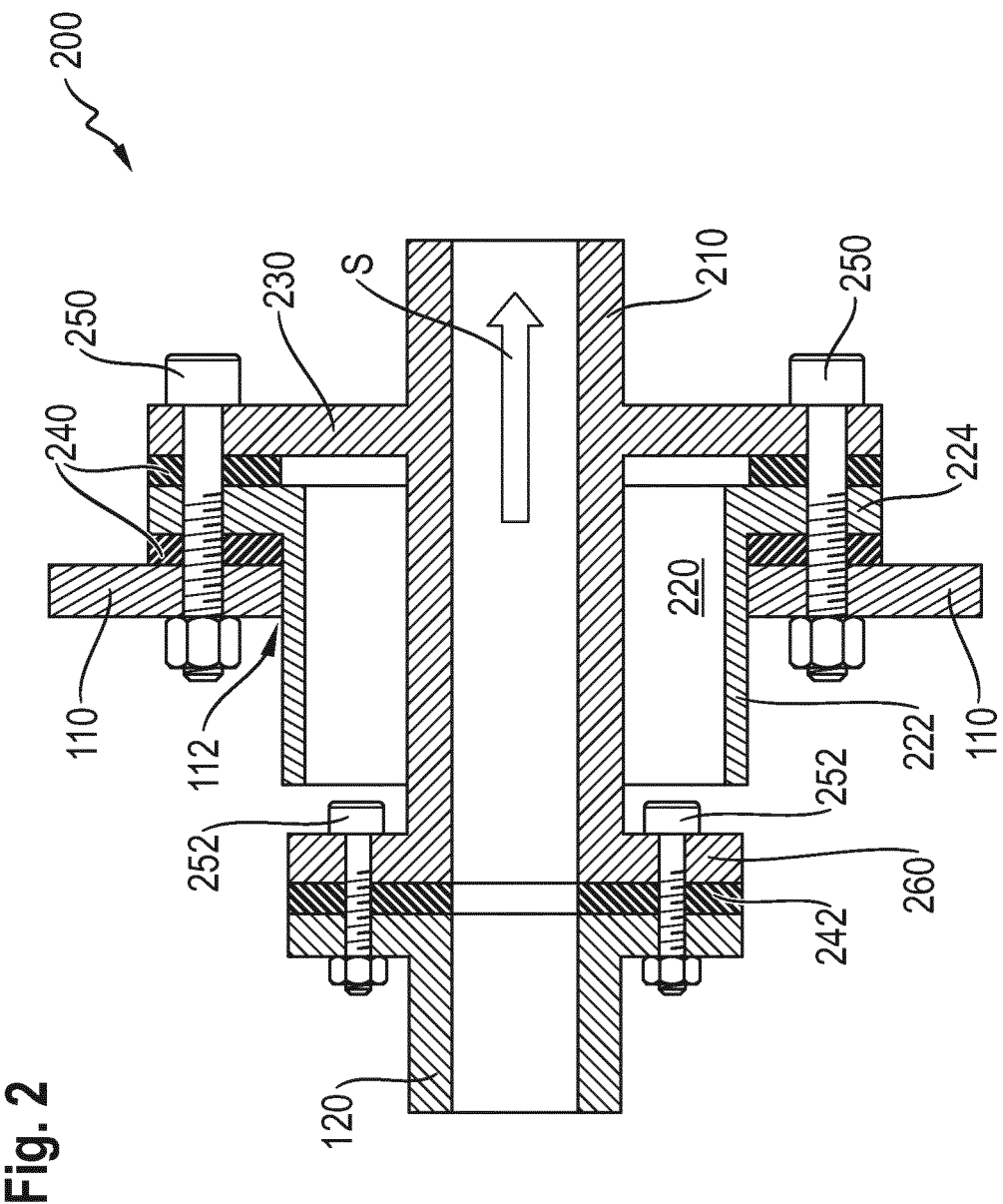
FIG. 2 an at least partially schematic sectional view of a tail pipe device according to an embodiment of the present invention in the installed state.

FIG. 2 shows an at least partially schematic sectional view of a tail pipe device according to an embodiment of the present invention in the installed state. The embodiment of a tail pipe device 200 shown in FIG. 2 corresponds, at least for the most part, to the embodiment of FIG. 1 or 1a such that the embodiments there also apply to FIG. 2, unless explicitly determined otherwise or evident to the person skilled in the art in a clear manner. To avoid repetitions, only supplemental remarks should follow with reference to FIG. 2: The direction of flow S shown in FIG. 2 indicates the preferred direction of movement of the exhaust gas volume flow. The flow S shown also serves as the basis for flow-oriented data, such as with respect to an upstream and downstream end of the exhaust pipe.

As can be seen in FIG. 2, opening 112 in housing wall 110 is larger in extent than a diameter of exhaust pipe 210. According to the embodiment of FIG. 2, the size of opening 112 is, at least for the most part, based on the geometrical dimensions of second flange 260 to guarantee that tail pipe device 200 can be inserted through opening 112 into housing 100 from the outside for installation. According to one embodiment of the present invention, in particular the embodiment of FIG. 2, first section 222 of insulator 220 extends, at least for the most part, parallel to an axial extension of tail pipe device 200 and/or direction of flow S. According to the embodiment of FIG. 2, first section 222, at least for the most part, abuts an edge of opening 112. According to the embodiment of FIG. 2, first section 222 of insulator 220 is spaced, at least for the most part, annularly from exhaust pipe 210. According to an alternative (not depicted) embodiment of the present invention, first section 222 abuts exhaust pipe 210, at least for the most part, in one area. In another (not depicted) embodiment of insulator 220, first section 222 of insulator 220 extends, at least for the most part, fully in the space between opening 112 and exhaust pipe 210. In other words, the insulator abuts both opening 112 and tail pipe 210, in particular, at least for the most part, completely.

Figure 3:
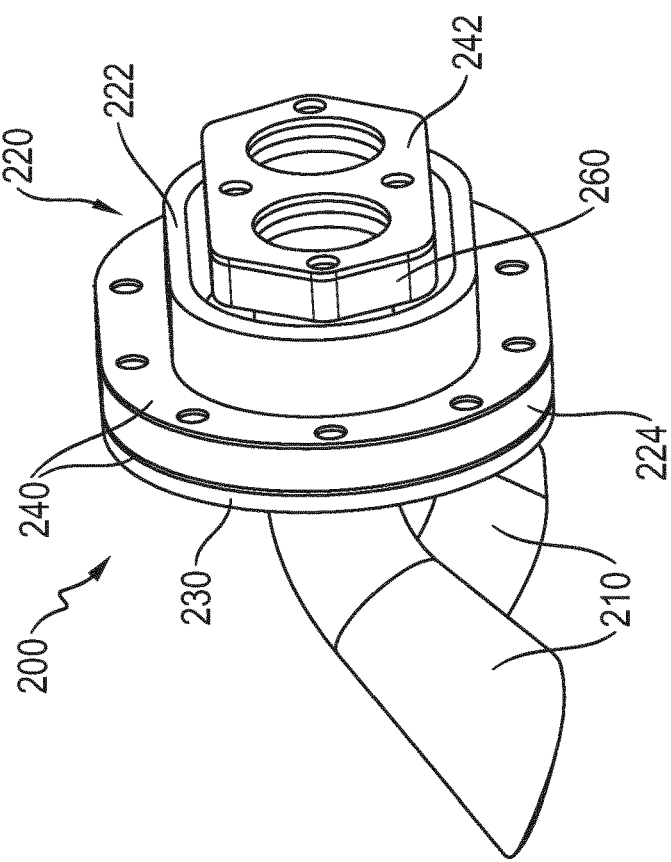
FIG. 3a an at least partially schematic 3D view of a tail pipe device according to an embodiment of the present invention.
FIG. 3b another view of the tail pipe device of FIG. 3a having holding elements.

FIG. 3a shows an at least partially schematic 3D view of a tail pipe device 200 according to an embodiment of the present invention, and FIG. 3b shows another view of tail pipe device 200 of FIG. 3a having holding elements.

In addition to the above embodiments, FIGS. 3a and 3b show that second flange 260 provides a joint connection for both exhaust pipes 210. Other sealing element 242 corresponds, at least for the most part, to the outer geometry of second flange 260 with corresponding recesses for holding means 252 and the exhaust gas volume flows, which are to be moved from the exhaust outlets into the exhaust pipes 210. The geometry of sealing elements 240, at least for the most part, corresponds to the outer geometry of first flange 230 having recesses for first section 222 of insulator 220 as well as for holding elements 250.

Figure 4:
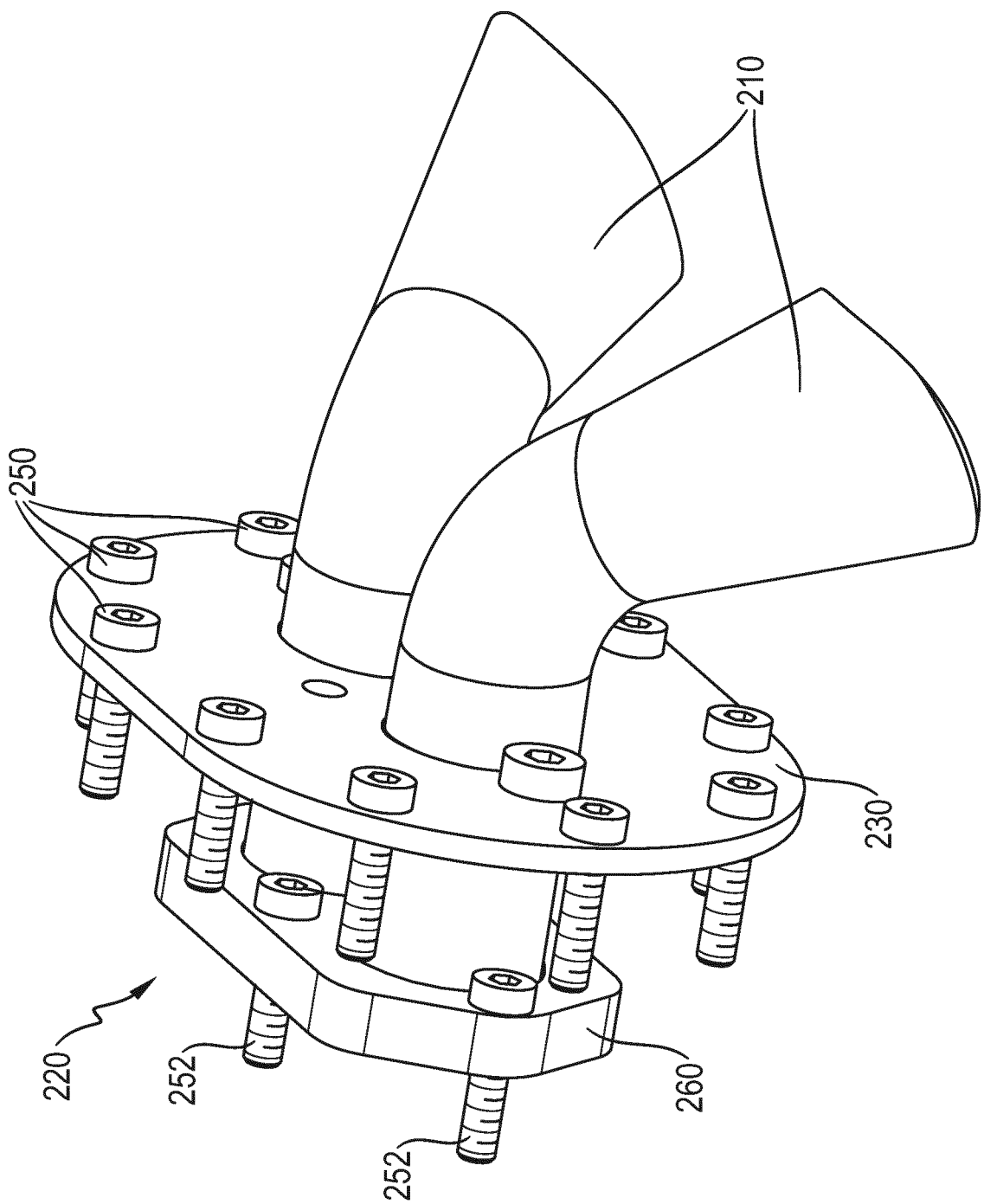
FIG. 4 an at least partially schematic 3D view of a tail pipe device according to an embodiment of the present invention having holding elements.

FIG. 4 shows another detailed view of tail pipe device 200, in particular of exhaust pipes 210, first flange 230 and second flange 260. According to a preferred embodiment, in particular the embodiment of FIG. 4, exhaust pipes 210, first flange 230 and second flange 260 are designed in one piece. This explicitly also means providing a corresponding assembly of components 210, 230 and 260, in particular in the form of a semi-finished product, the individual components being assembled later, that is, not in the course of a primary-forming manufacturing procedure, in particular by means of welding, soldering, gluing, clamping, bolting, riveting or the like. In general, it can be said for the figures described here that, for the sake of clarity, a number of the holding elements are always provided with reference numbers only by way of example, but this does not suggest a difference with respect to the non-referenced holding elements.

Figure 6B:
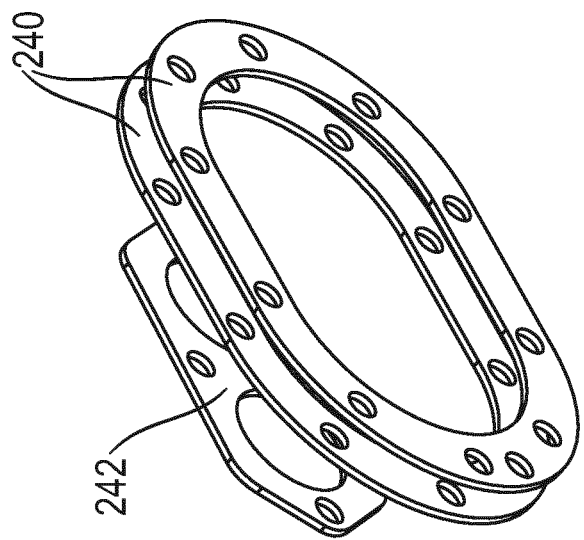
FIG. 6b a detailed view of the sealing elements of FIG. 5.
Figure 6A:
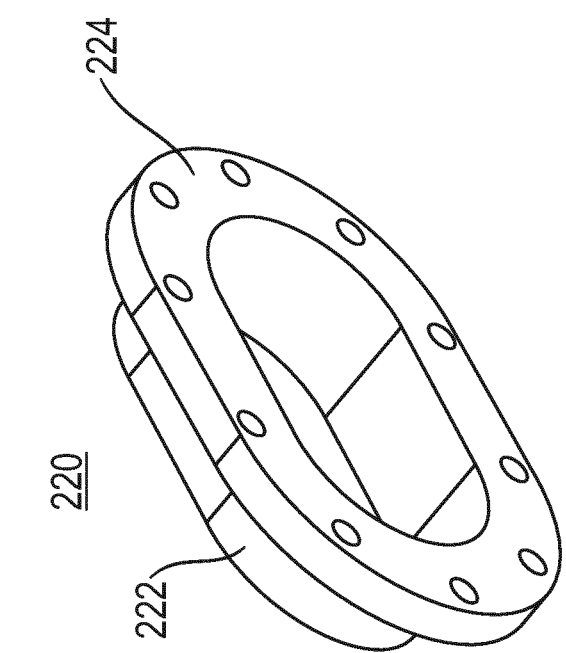
FIG. 6a a detailed view of the insulator of FIG. 5.

FIGS. 5, 6a and 6b once again show individual views in the context of the components of a tail pipe device described with the assembly according to at least one embodiment of the present invention.

Although exemplary embodiments were discussed in the preceding description, it should be noted that a plurality of variations is possible. In addition, it should be noted that the exemplary embodiments are only examples, which should in no way limit the scope of protection, the applications or design in any way. Instead, the preceding description should give the person skilled in the art a guideline for the implementation of at least one exemplary embodiment, it being possible to undertake various changes, in particular with respect to the function and arrangement of the components described, without departing the scope of protection that arises from the claims and these equivalent combinations of features.

LIST OF REFERENCE CHARACTERS

1 Generator unit
100 Housing
110 Housing wall
112 Opening in housing wall 110
120 Exhaust outlet
200 Tail pipe device
210 Exhaust pipe
220 Insulator
222 First section of insulator 220
224 Second section of insulator 220
230 First flange
240 Sealing element
242 (Other) sealing element
250 Holding means
252 (Other) holding means
260 Second flange
S Direction of flow

The invention claimed is:

1. A generator unit (1), comprising:
a housing (100) having at least one opening (112);
a fuel cell device, which is arranged in the housing (100);
a tail pipe device (200) having at least one exhaust pipe (210), which is connected to the fuel cell device in a gas-carrying manner and extends through the opening (112) of the housing (100); and
an insulator (220), which extends at least in an area between an outer wall of the exhaust pipe (210) and an edge of the opening (112) and at least for the most part, prevents, heat transfer from the exhaust pipe (210) to the housing (100);
wherein the at least one exhaust pipe (210) has a first flange (230), wherein the insulator (220) is arranged at least partially between the first flange (230) and a housing wall (110).

2. The generator unit according to claim 1, wherein a first section (222) of the insulator (220) has an, at least for the most part, cylindrical basic form.

3. The generator unit according to claim 1, wherein at least one second section (224) of the insulator (220) has an, at least for the most part, disk-shaped basic shape through which the at least one exhaust pipe (210) passes.

4. The generator unit according to claim 1, wherein the opening (112) is larger than the cross-section of the parts of the tail pipe device (200) arranged in the installation position inside of the housing (100).

5. The generator unit according to claim 1, wherein at least one, at least for the most part, at least water or gas-tight sealing element (240) is arranged at least between the insulator (220) and the first flange (230) or between the housing (100) and the insulator (220).

6. The generator unit according to claim 1, wherein the first flange (230) is held on the housing (100) by at least one holding means (250).

7. The generator unit according to claim 6, wherein the at least one holding means (260) reaches through the first flange (230) and a housing wall (110).

8. The generator unit according to claim 6, wherein the at least one holding means (250) is, at least for the most part, thermally decoupled from at least the first flange (230) or the housing (100).

9. The generator unit according to claim 1, further comprising a second flange (260), which is provided to connect the tail pipe device (200) to an exhaust outlet (120) of the fuel cell device, which terminates in the housing (100).

10. The generator unit according to claim 9, wherein the second flange (260) is shaped in such a way that it can be guided through the housing opening (112).

11. The generator unit according to claim 1, wherein the fuel cell device has a reformer.

12. A vehicle having a generator unit (1), comprising:
 a housing (100) having at least one opening (112);
 a fuel cell device, which is arranged in the housing (100);
 a tail pipe device (200) having at least one exhaust pipe (210), which is connected to the fuel cell device in a gas-carrying manner and extends through the opening (112) of the housing (100); and
 an insulator (220), which extends at least in an area between an outer wall of the exhaust pipe (210) and an edge of the opening (112) and at least for the most part, prevents, heat transfer from the exhaust pipe (210) to the housing (100);
 wherein the at least one exhaust pipe (210) has a first flange (230), wherein the insulator (220) is arranged at least partially between the first flange (230) and a housing wall (110).

13. The vehicle according to claim 12, further comprising a fuel reserve for the provision of fuel.

14. A tail pipe device (200) having:
 at least one exhaust pipe (210) having an upstream end and a downstream end;
 a first flange (230), which is provided to connect the tail pipe device (200) to a housing (100);
 a second flange (260), which is provided to connect the tail pipe device (200) to an exhaust outlet (120) which; and
 an insulator (220), which extends at least in an area between an outer wall of the exhaust pipe (210) and an edge of a housing opening (112); wherein the at least one exhaust pipe (210) has a first flange (230), wherein the insulator (220) is arranged at least partially between the first flange (230) and a housing wall (110).

15. The tail pipe device according to claim 14, wherein the insulator (220) extends all the way around an outer wall of the exhaust pipe (210) at least in at least one section or along the side of the first flange (230) in at least one area.

16. The tail pipe device according to claim 14, the second flange (260) is arranged closer to the upstream end of the exhaust pipe (210) than the first flange (230).

17. The vehicle according to claim 13, comprising fuel that is at least ethanol, bio-ethanol or water mixed with ethanol, the fuel being supplied at least partially as a reserve for the operation of the fuel cell device.

18. The tail pipe device (200) according to claim 14, wherein a generator unit (1) comprises:
 a housing (100) having at least one opening (112);
 a fuel cell device, which is arranged in the housing (100);
 the tail pipe device (200) having at least one exhaust pipe (210), which is connected to the fuel cell device in a gas-carrying manner and extends through the opening (112) of the housing (100); and
 an insulator (220), which extends at least in an area between an outer wall of the exhaust pipe (210) and an edge of the opening (112) and at least for the most part, prevents, heat transfer from the exhaust pipe (210) to the housing (100).

* * * * *